Patented Apr. 12, 1949

2,467,355

UNITED STATES PATENT OFFICE 2,467,355

REFINING OF ALKYL PHENOLS

Stephen P. Cauley, Garden City, N. Y., assignor to Socony-Vacuum Oil Company, Incorporated, a corporation of New York No Drawing. Application March 8, 1945, Serial No. 581,705

7 Claims. (Cl. 260—621)

The present invention relates to refining of alkyl phenols and, more particularly, to the refining of alkyl phenols contaminated by mercaptans and thiophenols.

As those skilled in the art know, alkyl phenols are readily extracted from petroleum oils by means of strong caustic solutions, especially strong caustic solutions containing solutizers and particularly by means of strong caustic solutions containing phenol. However, these strong caustic solutions also extract mercaptans and thiophenols which are generally present in the oil with practically equal facility. Consequently, the alkyl phenols are contaminated with undesirable mercaptans and thiophenols to a greater extent than is commercially acceptable unless the crude alkyl phenols are treated to remove these contaminants.

This problem has been recognized by the petroleum industry and many attempts have been made to provide a thoroughly satisfactory solution thereof. Among the processes suggested for the purpose of recovering and purifying alkyl phenols, those disclosed in U. S. Patent 2,150,656, U. S. Patent 2,163,227, U. S. Patent 2,168,256, U. S. Patent 2,184,928, U. S. Patent 2,203,217 and U. S. Patent 2,218,139 are illustrative of the various attempts which have been made to solve this problem. For example, the process described in U. S. Patent 2,150,656 involves steaming an aqueous solution of sodium salts of alkyl phenols and separating the sludge formed. The steamed solution is then blown at normal atmospheric temperature for six hours. The blown solution is washed with naphtha and the washed solution saturated with carbon dioxide to free or spring the alkyl phenols. The alkyl phenols are then distilled to produce several fractions of varying sulfur content. Those fractions having a sulfur content greater than about 0.36 per cent are combined, redissolved in caustic soda, blown again for several hours, liberated or sprung and distilled a second time.

U. S. Patent 2,168,256 provides a disclosure of a process wherein the thiophenols contained in crude alkyl phenols are decomposed by heating the alkyl phenols to a temperature of about 250° C. to about 360° C. in the presence of about 15 per cent to about 25 per cent excess of the stoichiometric amount of finely divided iron, cobalt, nickel or copper. On the other hand, U. S. Patent 2,163,227 provides a description of a process for recovering and refining alkyl phenols in which alkyl phenols together with impurities such as sulfur and nitrogen compounds are extracted from petroleum oil by means of a strong caustic phenolate solution. The resulting solution containing alkyl phenols and impurities is subjected to a steaming operation whereby some impurities are removed as vapors, and some impurities settle out as a sludge. The sludge is removed and the solution blown with air between the temperature limits of 0° C. and 90° C. for about 10 to 60 hours to oxidize the mercaptans and thiophenols to disulfides. The oxidation can be accelerated by the use of catalysts such as metals, oxides, and sulfides of copper, lead, manganese and ferrous metals or mixtures thereof, in particular nickel and lead sulfides. The disulfides formed by the oxidation are insoluble in the caustic solution and are removed by settling or other means. After removal of the disulfides the solution is carbonated with carbon dioxide which displaces the weaker alkyl phenols which rise to the top of the caustic solution and are removed. The recovered alkyl phenols are then subjected to vacuum distillation whereby they are separated from the heavier impurities and obtained in relatively pure form in the overhead vapor.

The foregoing brief discussion of the prior art clearly shows that the problem has not been completely solved when it takes from 10 to 60 hours to convert the mercaptans and thiophenols to disulfides by blowing air through the mixture.

It has now been discovered that the time required for oxidation of the mercaptans and thiophenols present in alkyl phenol extracts to disulfides can be reduced to about one hour in contrast to the 10 to 60 hours required by the processes of the prior art.

It is an object of the present invention to provide a process for extracting alkyl phenols from hydrocarbon oils, especially petroleum oils, and refining said alkyl phenols by oxidation of the sulfide-sulfur-containing compounds in the presence of a solution-soluble organic oxidation promoter. It is another object of the present invention to provide a process for extracting alkyl phenols from petroleum oils and refining said alkyl phenols by oxidation of the co-extracted mercaptans and thiophenols in the presence of a polyhydroxy benzene or an organic compound having a functional or reactive polyhydroxy benzene residue or nucleus. It is a further object of the present invention to provide a process for extracting alkyl phenols from petroleum oils and refining said alkyl phenols by oxidation of the co-extracted mercaptans and thiophenols in the presence of a polyhydroxy benzene, a polyhydroxy benzene carboxylic acid, or esters, derivatives or condensation products of polyhydroxy benzene carboxylic acids which have a functional or reactive polyhydroxy benzene structure. The present invention also has as an object a method for refining alkyl phenols contaminated with mercaptans and thiophenols by oxidizing said mercaptans and thiophenols to disulfides in the presence of an organic compound having a polyhydroxy benzene nucleus or structure. Other objects and advantages will become apparent from the following description.

In general the present invention provides a method for extracting alkyl phenols employing a strongly caustic aqueous solution containing a soluble organic oxidation promoter. An aqueous solution of caustic soda, caustic potash or the like of from 20 per cent to 50 per cent hydroxide concentration may be used although it is preferred to use aqueous solutions containing about 30 per cent to about 40 per cent caustic soda and about 10 per cent to about 20 per cent of phenol, cresols, etc. In addition to the alkali metal hydroxide, the aqueous solution should contain a soluble organic oxidation promoter capable of promoting or accelerating the oxidation of mercaptans and thiophenols. Preferably, the oxidation promoter is one or more of the organic compounds soluble in aqueous alkali metal hydroxide solutions, particularly such organic compounds as have the characteristic structure of polyhydroxy benzene and especially polyhydroxy benzenes, polyhydroxy benzene carboxylic acids, and esters, derivatives and condensation products of polyhydroxy benzene carboxylic acids. However, the preferred solution is an aqueous solution containing about 10 per cent by weight of cresols (1N to cresylate) and about 30 per cent sodium or potassium hydroxide (7N NaOH) about 1 per cent to about 10 per cent of a polyhydroxy benzene or polyhydroxy benzene carboxylic acid.

The oil containing the alkyl phenols and other organic compounds including mercaptans and thiophenols soluble in strong solutions of alkali metal hydroxide with or without a solutizer such as phenol, cresols or the like is contacted or intimately mixed, batch wise or continuously, with the strong caustic solution containing the organic oxidation promoter until the caustic solution has attained a maximum concentration of alkyl phenols. The oxidation promoter may be omitted from the extracting solution and added to the fat solution prior to oxidizing the mercaptans, etc. The fat solution containing the oxidation promoter is then blown with oxygen, oxygen-containing oxidizing gas, such as air, or other oxidizing gas until the mercaptan and thiophenol sulfur has been reduced to an acceptable value and the mercaptans and thiophenols converted to disulfides. The insoluble disulfides are removed in any suitable manner and the purified aqueous solution of alkyl phenols acidified in any suitable manner, for example, with mineral acid or carbon dioxide, to spring the alkyl phenols. The alkyl phenols are separated from the acidified aqueous solution in any suitable manner. The alkyl phenols thus obtained are then distilled if desirable.

Illustrative of the present process and providing comparative data on the sulfur content of alkyl phenols refined by air blowing in the presence of an organic oxidation promoter and of alkyl phenols not so treated is the following example.

Alkyl phenols were extracted from a 400° F. end point naphtha by contacting with a 20 per cent caustic solution, the solution being kept in service until it had attained a maximum concentration of alkyl phenols. A sample of this caustic phenolate solution was taken and divided into two parts. The first part was acidified with mineral acid and the alkyl phenol separated. To the second part was added 1 per cent by weight of tannin and the solution blown with air until all the mercaptans were completely converted to disulfides as shown by potentiometric titrations with silver nitrate solution, the time required being approximately half an hour, as compared to 10 to 60 hours in the absence of a promoter. The disulfide oil layer formed was removed and the solution then acidified with mineral acid and the alkyl-phenols separated. A comparison of the sulfur contents of the alkyl phenols recovered by the two processes described above are given below in Table I.

TABLE I

| Sample | Acid Recovered | Air Blown and Acid Recovered |
|---|---|---|
| Sulfur content of recovered alkyl phenols, percent by weight | 2.51 | [1] 1.67 |
| Sulfur removal, percent | | 34 |
| Sulfur content of 85% overhead from alkyl phenols, percent by weight | 1.68 | 0.63 |
| Sulfur removal, percent | 33 | 62.5 |

[1] 1% tannin.

Comparison of the results obtained by oxidation of mercaptans and thiophenols in the presence of the oxidation promoter of the present invention and the solid metallic catalysts of the prior art are provided by the following data which was obtained by dividing a caustic soda solution of alkyl phenols containing mercaptans and thiophenols into two portions. One portion was oxidized in the presence of solid catalyst disclosed in U. S. Patent No. 2,163,227 and the other portion oxidized in the presence of an organic oxidation promoter of the present invention.

TABLE II

Mercaptan sulfur in crude alkyl phenol solution, 0.84%

| Solid Catalyst | Oxidation Promoter |
|---|---|
| Catalyst, Nickel Sulfide. | Promoter, Tannin (Chestnut Extract). |
| Catalyst Conc., 3.0%. | Promoter Conc., 3%. |
| Air Blown 7½ hours. | Air Blown 1½ hours. |
| Percent Mercaptan Sulfur in Refined Alkyl Phenols 0.04. | Percent Mercaptan Sulfur in Refined Alkyl Phenols 0.000. |

The foregoing data clearly demonstrates the advantage of oxidizing the mercaptans and thiophenols to disulfides in the presence of an organic oxidation promoter.

The organic oxidation promoters of this invention may be divided into three groups as follows: phenolic acids such as gallic and protocatechuic acid, polyhydric phenols such as hydroquinone and pyrogallol, and tannins. The tannins may be divided into three groups according to the classification advocated by Perkin and Everst as follows: tannins related to depsides, tannins related to diphenyl-dimethylolid, and phlobatannins. All of the aforementioned compounds have been found to be effective in promoting the oxidation of mercaptans to disulfides.

The literature reveals that some metallic inorganic compounds, such as the oxides and sulfides of copper, lead, nickel, manganese and ferrous metals, have been used to catalyze the oxidation of mercaptans to disulfides. The common method of using these catalysts is in a slurry or deposited on a bed of inert carrier through which the liquid is passed. In either method of application it is difficult to attain intimate contact between the three phases: air, liquid and solid. As a result, the effective activity of the catalyst is low and a long time is required to attain complete oxidation of the mercaptans.

In contrast to the solid catalysts, a soluble promoter involves only two phases, liquid and air, and as a result very intimate contact is attained between the reactants and the promoter, and the reaction proceeds to completion in a comparatively short space of time.

The polyhydric phenols are the most active of the soluble promoters, the phenolic acids next and the tannins the least active. However, the tannins are least subject to deterioration and loss of activity during the oxidation, and since they are also by far the cheapest and easiest to obtain they are the recommended promoter for commercial use.

Pure tannin may be employed, but it has been found entirely satisfactory to use vegetable extracts containing tannin, and they are much more desirable from an economic standpoint. The extracts are obtainable as either a liquid or solid. If the liquid extract is used it may be added directly to the alkaline phenolate solution. In the case of the solid extract it may be either added directly or first dissolved in water and the water solution added. In any case the resulting solution should be thoroughly mixed to avoid local concentrations of the tannin which might otherwise cause uneven oxidation. The tannin may be added in any amount up to its limit of solubility, but it has been found satisfactory for all ordinary purposes to use 1 per cent by weight.

Several methods are available for blowing the solution with air. The most efficient method of contact has proven to be a packed tower, any of the popular types of carbon packing being suitable for use. The solution is introduced at the top of the tower and flows down through the packing and is removed at the bottom; the air meanwhile is introduced at the bottom of the tower through a distributor and rises through the descending solution, the packing providing for very intimate contact thereby. Since the packed tower has a high initial cost of installation, it may prove desirable to use the less efficient and more cheaply installed method of blowing air through the solution contained in an open vat, the air being introduced through a distributor located in the bottom of the vat.

The alkaline phenolate solution may or may not be steamed prior to adding the tannin and blowing with air, depending upon the type of petroleum oil from which the phenols were extracted, as this in turn determines the types and amounts of impurities present. If the impurities consist chiefly of mercaptans the steaming may be reduced to a minimum or eliminated entirely since these soluble catalysts are capable of completely oxidizing the mercaptans to disulfides at room temperature.

More specific data on the comparative rates of oxidation of mercaptans in alkaline phenolate solutions with and without catalyst are given in Table III.

TABLE III

Oxidation of n-butyl mercaptan

Solution used, 5N sodium hydroxide, 1N sodium cresylate
Air to solution ratio, 6/1[1]
Temperature, 80° F.
Mercaptan, $nC_4H_9HS$

[1] 6 volumes of air to one volume of solution were used in each oxidation test of one minute duration. The tests consisted in shaking the solution with measured amounts of air in separatory funnels.

| Oxidation Time | Mercaptan Sulfur | |
|---|---|---|
| | No Tannin Present | 1% by Wt. of Tannins |
| | Weight per cent | |
| 0 minutes | 1.01 | 0.97 |
| 1 minute | 0.97 | 0.81 |
| 2 minutes | 0.97 | 0.63 |
| 3 minutes | 0.97 | 0.39 |
| 4 minutes | 0.98 | 0.19 |
| 5 minutes | 0.96 | 0.06 |

Solution used, 10% sodium hydroxide
Air to solution, 6/1
Temperature, 80° F.
Mercaptan, $CH_3HS$

| Oxidation Time | Mercaptan Sulfur | |
|---|---|---|
| | No Tannin Present | 1% by Wt. of Tannins |
| | Weight per cent | |
| 0 minutes | 1.005 | 1.025 |
| 1 minute | 0.995 | 0.670 |
| 2 minutes | 0.985 | 0.310 |
| 3 minutes | 0.975 | 0.030 |
| 4 minutes | 0.965 | |
| 5 minutes | 0.955 | |

While all of the organic oxidation promoters provide satisfactory commercial rates of conversion of mercaptans to disulfides, the various promoters differ among themselves in effectiveness. This is illustrated by the data submitted in Table IV.

TABLE IV

Solution used, 5N sodium hydroxide, 1N sodium cresylate
Air to solution ratio, 6/1
Mercaptan, $nC_4H_9HS$
Temperature, 80° F.

| Concentration, Weight Per Cent | Average Oxidation Slope [1] | | |
|---|---|---|---|
| | Gallic Acid | Hydroquinone | Pyrogallol |
| 0 | 0.003 | 0.003 | 0.003 |
| 0.25 | 0.074 | 0.107 | 0.295 |
| 0.50 | 0.118 | 0.163 | 0.334 |
| 1.0 | 0.122 | 0.163 | 0.350 |

[1] Average oxidation slope = per cent sulfur removed per minute.

Tannin may be used as an oxidation promoter either as the pure compound or contained in one of the many vegetable extracts which are available. Many of these extracts have been tested, and the rates of oxidation using a few of these will be found in Table V.

TABLE V

Solution used, 5N sodium hydroxide, 1N sodium cresylate
Air to solution ratio, 6/1
Mercaptan, $nC_4H_9HS$ Temperature, 80° F.
Tannin concentration, per cent by wt., 1

Tannin material: Average oxidation slope
- Chestnut _____ 0.19
- Wattle _____ 0.19
- Quebracho _____ 0.13
- Spruce _____ 0.08
- Oak _____ 0.15
- Sumac _____ 0.18
- Tara _____ 0.14
- Ulmo _____ 0.13
- Logwood #4 _____ 0.14

The tannin may be used in any concentration from 1/10 of 1 per cent up to its limit of solubility However, a concentration of 1 per cent gives optimum results with respect to time and expense as may be seen by reference to Table VI.

TABLE VI

Solution used, 5N sodium hydroxide, 1N sodium cresylate
Air to solution ratio, 6/1
Mercaptan, $nC_4H_9HS$
Temperature, 80° F.

| Tannin Concentration, Per Cent by weight | Average Oxidation Slope |
|---|---|
| 0.25 | 0.13 |
| 0.50 | 0.15 |
| 1.0 | 0.19 |
| 3.0 | 0.20 |

The influence of temperature upon the rate of oxidation of mercaptan in alkaline phenolate solutions containing tannin is shown by the data given in Table VII.

TABLE VII

Solution used, 6N sodium hydroxide, 1N sodium cresylate
Air to solution rate, 6/1
Mercaptan, $nC_4H_9HS$
Tannin concentration, per cent by wt., 1

| Temperature, °F. | Average Oxidation Slope |
|---|---|
| 41 | 0.743 |
| 83 | 1.28 |
| 112 | 1.92 |
| 153 | 1.98 |

The rate of oxidation is satisfactory at room temperature (15° C. to 20° C.). However, if it is so desired, it may be carried out at higher temperatures such as 50° C. to 90° C. at which latter temperature the reversion of disulfide to mercaptans begins to take place.

The foregoing data clearly prove that soluble organic oxidation promoters have a marked accelerating effect upon the rate of oxidation as compared with solid catalysts. In other words, oxidation of mercaptans and thiophenols in a homogeneous system is more rapid than in a heterogeneous system using solid catalysts.

While data showing the accelerating effect of soluble organic oxidation promoters upon the conversion of mercaptans and thiophenols to disulfides and the refining of alkyl phenols by means of specific examples thereof has been set forth herein, the scope of the present invention is only to be limited by the appended claims.

I claim:

1. The process of refining alkyl phenols containing mercaptans which comprises dissolving alkyl phenols and mercaptans in an aqueous solution containing about 15 per cent to about 50 per cent by weight alkali metal hydroxide, adding about 0.1 per cent to about 10 per cent by weight of a soluble organic oxidation promoter having an effective polyhydroxy benzene group to said aqueous solution, passing air through said aqueous solution to convert mercaptans to disulfides, and separating said disulfides.

2. The process of refining alkyl phenols containing mercaptans which comprises dissolving alkyl phenols and contaminating mercaptans in an aqueous solution containing about 15 per cent to about 50 per cent by weight free and combined alkali metal hydroxide, adding about 1 per cent by weight of tannin, passing air through said aqueous solution while maintaining the temperature thereof at about 15° C. to about 90° C. to convert mercaptans to disulfides, and separating said disulfides.

3. In the process for recovering and refining alkyl phenols which comprises contacting a water-immiscible liquid containing alkyl phenols, and at least one thiol of the group mercaptans and thiophenols with a strongly caustic aqueous solution to dissolve at least a portion of said alkyl phenols, and thiol in said aqueous solution, treating said aqueous solution to remove said thiol and treating said thiol-free solution to recover alkyl phenols, the improvement which comprises oxidizing said thiol in said aqueous solution to disulfide in the presence of a phenolic oxidation promoter capable of accelerating the oxidation of thiol to disulfide in the presence of oxygen-containing oxidizing gas.

4. In the process for recovering and refining alkyl phenols which comprises contacting a water-immiscible liquid containing alkyl phenols, and at least one thiol of the group mercaptans and thiophenols with a strongly caustic aqueous solution to dissolve at least a portion of said alkyl phenols, and thiol in said aqueous solution, treating said aqueous solution to remove said thiol and treating said thiol-free solution to recover alkyl phenols, the improvement which comprises oxidizing said thiol in said aqueous solution to disulfide in the presence of a phenolic oxidation promoter having a plurality of hydroxyl groups two of which are attached to the same benzene ring in positions ortho to each other.

5. In the process for recovering and refining alkyl phenols which comprises contacting a water-immiscible liquid containing alkyl phenols, and at least one thiol of the group mercaptans and thiophenols with a strongly caustic aqueous solution to dissolve at least a portion of said alkyl phenols, and thiol in said aqueous solution, treating said aqueous solution to remove said thiol and treating said thiol-free solution to recover alkyl phenols, the improvement which comprises oxidizing said thiol in said aqueous solution to disulfide in the presence of a phenolic oxidation promoter having a plurality of hydroxyl groups two of which are attached to the same benzene ring in positions para to each other.

6. The process of refining crude alkyl phenols containing thiols which comprises establishing a body of strongly caustic aqueous solution containing alkyl phenols and thiols, adding at least about 0.1 weight per cent of a phenolic oxidation promoter capable of accelerating the oxidation of thiols to disulfides in the presence of oxygen, and passing an oxygen-containing oxidizing gas through said aqueous solution.

7. The process of refining alkyl phenols containing thiols which comprises dissolving alkyl phenols and contaminating thiols in an alkaline aqueous solution, passing an oxygen-containing oxidizing gas through said aqueous solution in the presence of a phenolic oxidation promoter capable of accelerating the oxidation of thiols to disulfides in the presence of oxygen to oxidize at least a portion of said thiols to disulfides, and separating said disulfides from said alkyl phenols.

STEPHEN P. CAULEY.

REFERENCES CITED

The following references are of record in the file of this patent:

UNITED STATES PATENTS

| Number | Name | Date |
| --- | --- | --- |
| 2,150,656 | Lounsbury | Mar. 14, 1939 |
| 2,163,227 | Hund | June 20, 1939 |
| 2,203,217 | Hund | June 4, 1940 |
| 2,315,530 | Loyd | Apr. 6, 1943 |
| 2,413,945 | Bolt | Jan. 7, 1947 |